United States Patent Office 3,050,544
Patented Aug. 21, 1962

3,050,544
CYANOBENZYL AMINE
Edward W. Pietrusza, Morris Township, Morris County, and Richard E. Brown, Hanover, N.J., and Max B. Mueller, Media, Pa., assignors to Allied Chemical Corporation, New York, N.Y., a corporation of New York
No Drawing. Filed Apr. 30, 1959, Ser. No. 809,906
5 Claims. (Cl. 260—465)

This invention relates to a process for the preparation of cyanobenzyl amine.

Although it had heretofore been known that dinitriles could be partially reduced, the processes heretofore available led to the formation of substantial quantities of the diamine, secondary amines and unreacted starting material. Consequently, the processes were in reality uneconomical and far from commercially practicable.

Since cyanobenzyl amine is of commercial interest in the manufacture of materials such as benzylamine-4-carboxylic acid which itself is of commercial interest in the manufacture of polyamides, it is an object of this invention to provide a convenient and economic route for its preparation.

It has now been found that cyanobenzyl amine can be prepared conveniently and economically by reducing phthalonitrile in a dilute slurry of a polar solvent as rapidly as possible at a low temperature in the presence of a palladium catalyst and separating the crude cyanobenzyl amine from the reaction residues by a simple flash distillation.

The partial reduction may be carried out in the absence of chemical reagents such as ammonia to suppress the reaction of the primary amine with the intermediate aldimines to yield secondary amines or chemical reagents such as acetic acid, acetic anhydride, hydrochloric acid or sulfuric acid which agents are usually used for the purpose of combining with the primary amine as rapidly as it is formed and thus preventing its reaction with the aldimine. By omitting the use of such reagents the process is substantially simplified.

When palladium is used as the catalyst and the phthalonitrile is reduced in a reaction medium consisting essentially of methanol at a low temperature, the reduction to the cyanobenzyl amine takes place at a very rapid rate. However, once the cyanobenzyl amine has been formed the reducing action slows down and practically comes to a standstill. Very little by-product is formed and the desired amine is readily isolated from the reaction products by a simple flash distillation.

The temperature of the reaction should not be allowed to exceed 100° C. if good results are to be obtained, preferably the reaction conditions should be such that the temperature is held within the range 10–50° C., while the pressure of the hydrogen within the reaction vessel is maintained between 1 and 10,000 p.s.i.g. While pressure is not critical, preferably a reaction pressure of 50–500 p.s.i.g. is maintained.

The solids (phthalonitrile) content in the reaction medium should be no greater than about 50%, for best results it is preferably maintained within the range of 10–30%.

The reaction proceeds best when a fresh active catalyst is used, preferably a 5–10% palladium catalyst suspended on a suitable carrier such as charcoal. The palladium catalyst is used in amounts of 0.1 to 10% by weight of phthalonitrile, preferably 5 to 8%. In carrying out the reaction hydrogen is introduced into the reactor until one nitrile of the phthalonitrile is reduced. The reaction time for the reduction of terephthalonitrile with a palladium on charcoal catalyst and methanol as the solvent under the specific temperature and pressure conditions given above is 60 minutes or less and can usually be held to less than 15 minutes.

It has been found that under the above noted reaction conditions the reduction of the cyanobenzyl amine is practically eliminated since the rate of hydrogenation of the cyano group of cyanobenzyl amine is negligible under these conditions. Formation of by-product residues, secondary amines, etc. are kept to a minimum averaging between 5 and 10%. In this respect it is helpful to remove the product from the reactor quickly and isolate the cyanobenzyl amine as soon as possible. The catalyst recovered can be reactivated by a simple washing with acetic acid, water and/or methanol.

A typical procedure for the preparation of p-cyanobenzyl amine in methanol is as follows:

A 5% palladium on charcoal catalyst (8 parts by weight) was placed in a stainless steel reactor equipped with a paddle type agitator. After thoroughly flushing the reactor and catalyst wtih nitrogen, a nitrogen-purged slurry of terephthalonitrile (256 parts by weight) in methanol (2000 parts by weight) was introduced. The reactor was sealed and swept with hydrogen in the usual manner and then filled with hydrogen to ca. 600 p.s.i.g. Agitation was started and the reaction mixture was maintained at 300–600 p.s.i.g. hydrogen until sufficient hydrogen had been absorbed to account for ca. 50% of the total theoretical hydrogen required for complete reduction to the diamine. Heat was not applied. After approximately 15 minutes, the reactor was immediately flushed with nitrogen and the solution filtered to remove the catalyst and a small amount (ca. 1%) of unreacted terephthalonitrile. The filtrate was distilled under a partial vacuum to ca. 25% of the original volume and then cooled at −15° C. for ca. 12 hours.

The precipitated terephthalonitrile (ca. 3%) was filtered and washed with cold methanol. The methanol was removed from the filtrate and the residual yellow oil was distilled under reduced pressures of 0.1 to 0.5 mm. There was obtained ca. 212 parts by weight of a colorless oil, B.P. 82–84° C./0.5 mm.; analysis of this oil indicated the presence of ca. 5% p-xylylene diamine.

This crude cyanobenzyl amine (212 parts by weight) was dissolved in 530 parts by weight of warm water (30–50° C.). Upon standing at 0–10° C. for several hours, there was obtained ca. 222 parts by weight of pure, p-cyanobenzyl amine monohydrate, M.P.=53–4° C. corresponding to a 74% yield.

The following table illustrates yields of p-cyanobenzyl amine obtained when terephthalonitrile is reduced in anhydrous methanol in the presence of a 5% palladium on charcoal catalyst under the varying specified reaction conditions.

Table I
TPN REDUCTIONS IN ANHYDROUS METHANOL WITH Pd

| Run No. | Concentration, parts TPN per 100 parts MeOH | Temp., °C. | Pressure, p.s.i.g. H₂ | Time, mins. | Ca., percent H₂ take-up | Percentage of— | | | | Material [5] balance as mol percent |
|---|---|---|---|---|---|---|---|---|---|---|
| | | | | | | 4-CN-BA[1] | Rec. TPN[2] | Diamine[3] | Residue[4] | |
| 1 | 6.4 | 16-18 | 500-600 | 86 | 50 | 77 | 0 | | 17 | 94 |
| 2 | 12.8 | 10-22 | 500-600 | 188 | 50 | 78 | 0 | | 16.4 | 94.4 |
| 3 | 12.8 | 35-45 | 400-600 | 13 | 50 | 78.1 | 3.7 | | 12.3 | 94.1 |
| 4 | 12.8 | 35-47 | 400-600 | 13 | 50 | 86.1 | 2.7 | | 10.1 | 98.9 |
| 5 | 25.6 | 22-43 | 200-500 | 44 | 50 | 71.7 | 7.5 | | 18.2 | 97.4 |
| 6 | 12.8 | 36-47 | 400-600 | 17 | 50 | 82.6 | 2.4 | | 12.1 | 97.1 |

[1] p-Cyanobenzylamine, flash distilled; analysis indicates the presence of an average of 3-5% p-xylylene diamine.
[2] Recovered, unreacted terephthalonitrile.
[3] p-Xylylene diamine was not isolated, but analyses indicated an average of 3-5% was present in the cyanobenzyl amine.
[4] High boiling residue, believed to be principally 4,4'-(bis-cyano) dibenzyl amine.
[5] The remainder believed to be handling losses.

NOTE.—All of the runs were made in a stainless steel reactor with a 5% Pd on C catalyst (10 parts catalyst/128 parts TPN).

Table II which is given below illustrates the percent yield of m-cyanobenzyl amine that can be obtained by the reduction of isophthalonitrile suspended in anhydrous methanol in the presence of a palladium on charcoal catalyst under the varying specified reaction conditions.

Table II
IPN REDUCTIONS IN ANHYDROUS METHANOL WITH Pd

| Run No. | Concentration, parts IPN per 100 parts MeOH | Temp., °C. | Pressure, p.s.i.g. H₂ | Time, mins. | Ca., percent H₂ take-up | 4-CN-BA[1] | Rec. IPN[2] | Diamine | Residue[3] | Material[4] balance as mol percent |
|---|---|---|---|---|---|---|---|---|---|---|
| 7 | 6.4 | 26-37 | 30-50 | 100 | 50 | 63 | 0 | | 25 | 88 |
| 8 | 12.8 | 38-46 | 600-800 | 73 | 50 | 59 | 0 | | 36 | 95 |
| 9 | 12.8 | 46-53 | 600-800 | 24 | 50 | 61 | 1 | | 33 | 95 |

[1] m-Cyanobenzylamine, distilled; M.P. 85-88° C./0.1 mm.; forms a monohydrate; M.P. ca. 28° C.
[2] Recovered unreacted isophthalonitrile.
[3] High boiling condensation products.
[4] The remainder believed to be handling losses.

NOTE.—Run 7 was made in a Parr hydrogenation unit, runs 8 and 9 in a stainless steel reactor, all with a 5% Pd on C catalyst (10 parts catalyst/128 parts IPN in runs 7-8, 20 parts in run 9). The IPN used was a recrystallized product; M.P. 163° C.

Table III shows the reduction of terephthalonitrile with other catalyst systems which give substantially the same yield of p-cyanobenzyl amine in the range of about 70-90 mol percent based on the terephthalonitrile reacted.

Table III
TPN REDUCTIONS WITH OTHER CATALYST SYSTEMS

| Run No. | Concentration, parts TPN per 100 parts MeOH | Temp., °C. | Pressure, p.s.i.g. H₂ | Catalyst[1] | Results |
|---|---|---|---|---|---|
| 10 | 6.4 | 28-42 | 30-50 | 2% Pd on C | 50% red'n in 2 hrs. |
| 11 | 6.4 | 28-43 | 30-50 | 5% Pd on alumina | 45% red'n in 2 hrs. |
| 12 | 6.4 | 28-49 | 30-50 | 5% Pd on CaCO₃ | 40% red'n in 6 hrs. |
| 13 | 6.4 | 28-44 | 30-50 | Pd powder | 50% red'n in 1 hr. |

[1] Catalyst to TPN ratio 1:12.8.

The process of this invention is of great commercial interest because it is simple to operate. The hydrogenation can be carried out in simple low pressure apparatus. The danger of the formation of side reaction products is limited and last but not least the reaction leads to the direct formation of the desired product which can be easily and readily separated from the reaction product.

Although certain preferred embodiments of the invention have been disclosed for purpose of illustration, it will be evident that various changes and modifications may be made therein without departing from the scope and spirit of the invention.

We claim:
1. The method of preparing a cyanobenzyl amine selected from the group consisting of p- and m-cyanobenzyl amine by hydrogenating a phthalonitrile selected from the group consisting of tere- and iso-phthalonitrile suspended in a reaction medium consisting essentially of methanol in the presence of a palladium catalyst at reaction temperatures which do not exceed 100° C. to produce a cyanobenzyl amine.

2. The method of preparing a cyanobenzyl amine selected from the group consisting of p- and m-cyanobenzyl amine by hydrogenating a phthalonitrile selected from the group consisting of tere- and iso-phthalonitrile suspended in a reaction medium consisting essentially of methanol in the presence of a palladium catalyst at a reaction temperature within the range of 10-50° C. and separating the cyanobenzyl amine so produced from the reaction products.

3. The method of preparing a cyanobenzyl amine selected from the group consisting of p- and m-cyanobenzyl amine by hydrogenating a phthalonitrile selected from the group consisting of tere- and iso-phthalonitrile suspended in a reaction medium consisting essentially of methanol in the presence of a palladium catalyst at reaction temperatures which do not exceed 100° C. and separating the cyanobenzyl amine so produced from the reaction products by flash distillation.

4. The method of preparing a cycanobenzyl amine selected from the group consisting of p- and m-cyanobenzyl amine by hydrogenating a phthalonitrile selected from the group consisting of tere- and meta-phthalonitrile suspended in methanol in the presence of 5–10% palladium catalyst supported on charcoal at a reaction temperature within the range of 10–50° C. and separating the cyanobenzyl amine so produced from the reaction products.

5. The method of preparing a cyanobenzyl amine selected from the group consisting of p- and m-cyanobenzyl amine by hydrogenating a phthalonitrile selected from the group consisting of tere- and meta-phthalonitrile suspended in methanol wherein the solids content of the phthalonitrile in the methanol is no greater than 30% and the hydrogenation is carried out in the presence of a 5–10% palladium catalyst supported on charcoal at a reaction temperature which does not exceed 50° C. and separating the cyanobenzyl amine so produced from the reaction products.

References Cited in the file of this patent

UNITED STATES PATENTS 2,864,863   Young _____ Dec. 16, 1958

FOREIGN PATENTS 814,631   Great Britain _____ June 10, 1959

UNITED STATES PATENT OFFICE
CERTIFICATE OF CORRECTION

Patent No. 3,050,544                 August 21, 1962

Edward W. Pietrusza et al.

It is hereby certified that error appears in the above numbered patent requiring correction and that the said Letters Patent should read as corrected below.

Columns 3 and 4, Table II, third column, Run No. 7, for "26-37" read -- 27-37 --; same table, seventh column heading, for "4-CN-BA$^1$" read -- 3-CN-BA$^1$ --; same column, footnote 1 of Table II, for "M.P. 85-88° C." read -- B.P. 85-88° C. --.

Signed and sealed this 22nd day of January 1963.

(SEAL)
Attest:

ERNEST W. SWIDER
Attesting Officer

DAVID L. LADD
Commissioner of Patents